United States Patent
Wang et al.

(10) Patent No.: US 10,694,324 B2
(45) Date of Patent: Jun. 23, 2020

(54) METHOD AND APPARATUS FOR MATCHING WIRELESS HOTSPOT WITH POI

(71) Applicant: Baidu Online Network Technology (Beijing) Co., Ltd., Beijing (CN)

(72) Inventors: Tianyi Wang, Beijing (CN); Chao Li, Beijing (CN); Haishan Wu, Beijing (CN)

(73) Assignee: Baidu Online Network Technology (Beijing) CO., LTD, Beijing (CN)

( * ) Notice: Subject to any disclaimer, the term of this patent is extended or adjusted under 35 U.S.C. 154(b) by 283 days.

(21) Appl. No.: 15/425,316

(22) Filed: Feb. 6, 2017

(65) Prior Publication Data
US 2018/0041867 A1 Feb. 8, 2018

(30) Foreign Application Priority Data

Aug. 5, 2016 (CN) .......................... 2016 1 0641407

(51) Int. Cl.
| H04W 4/02 | (2018.01) |
| H04W 4/021 | (2018.01) |
| H04W 64/00 | (2009.01) |
| H04W 48/16 | (2009.01) |
| H04W 84/04 | (2009.01) |

(52) U.S. Cl.
CPC .......... *H04W 4/023* (2013.01); *H04W 4/021* (2013.01); *H04W 48/16* (2013.01); *H04W 64/003* (2013.01); *H04W 84/042* (2013.01)

(58) Field of Classification Search
CPC combination set(s) only.
See application file for complete search history.

(56) References Cited

U.S. PATENT DOCUMENTS

| 8,566,029 | B1 * | 10/2013 | Lopatenko | ........... G08G 1/0962 701/426 |
| 2006/0240840 | A1 * | 10/2006 | Morgan | .................... G01S 5/02 455/456.1 |
| 2010/0085947 | A1 * | 4/2010 | Ringland | .............. H04W 28/00 370/338 |

(Continued)

FOREIGN PATENT DOCUMENTS

| CN | 103152696 A | 6/2013 |
| CN | 104573042 A | 4/2015 |

*Primary Examiner* — Steven S Kelley
(74) *Attorney, Agent, or Firm* — Knobbe, Martens, Olson & Bear, LLP

(57) ABSTRACT

In some embodiments, a method includes: obtaining position information of a wireless hotspot where the user locates, based on hotspot scanning information of wireless hotspots already scanned by the user; acquiring one or more candidate Points of Interest (POIs) close to the wireless hotspot based on the position information; based on characteristic information corresponding to the wireless hotspot and respective candidate POIs, ranking all candidate POIs to determine an POI matching the wireless hotspot, wherein the characteristic information comprises access characteristic information. In some embodiments, the following advantages may be realized: the POI matching the wireless hotspot is obtained based on relevant data that the user scans the wireless hotspot to predict the POI actually accessed by the user without a procedure of manually collecting the data or user feedback, thereby improving the efficiency.

21 Claims, 2 Drawing Sheets

(56) References Cited

U.S. PATENT DOCUMENTS

| | | | |
|---|---|---|---|
| 2013/0260797 A1* | 10/2013 | Jones | H04W 4/02 |
| | | | 455/456.3 |
| 2013/0289846 A1* | 10/2013 | Mitchell | G06F 17/00 |
| | | | 701/99 |
| 2014/0171100 A1* | 6/2014 | Marti | G01S 5/0242 |
| | | | 455/456.1 |
| 2016/0157062 A1* | 6/2016 | Shim | G06N 5/04 |
| | | | 455/456.3 |

* cited by examiner

_METHOD AND APPARATUS FOR MATCHING WIRELESS HOTSPOT WITH POI_

CROSS-REFERENCE TO RELATED APPLICATIONS

This application claims the benefit of Chinese Patent Application No. 201610641407.1, entitled "Method and Apparatus For Matching Wireless Hotspot With POI," filed on Aug. 5, 2016, which is hereby incorporated by reference in its entirety.

TECHNICAL FIELD

The present disclosure relates to the technical field of computers, and particularly to a method and apparatus for matching a wireless hotspot with a Point of Interest (POI).

BACKGROUND

As mobile Internet and mobile smart devices and terminals develop constantly, wireless hotspots become one of the requisite facilities and services for individuals, homes and enterprises, and in service industries such as, restaurants, hotels and retail. A wireless hotspot may generally cover a distance of about 50 meters indoor. If a user scans or connects with the wireless hotspot, it may be believed that the user accesses a Point of Interest (POI) where the wireless hotspot locates. Hence, the POI accessed by the user offline may be inferred based on the wireless hotspot information scanned or connected by the user and a matching relationship between the wireless hotspot and the POI.

In solutions in the existing art, there are mainly three approaches of calculating and collecting the matching relationship between the wireless hotspot and the POI:

1) Collecting by a dedicated employee hired by a company or enterprise. The company or enterprise may specifically assign a dedicated employee and provide equipment and training to collect the matching information between the wireless hotspot and the POI.
2) Collecting using user uploaded data, i.e., encouraging the user to sign at the POI where the user locates while connecting the wireless hotspot, and thereby obtaining the matching relationship between the wireless hotspot and the POI.
3) Matching surrounding POI names based on SSID of the wireless hotspot.

However, the above approaches have their own drawbacks:

1) Regarding the approach of collecting by a dedicated employee specifically assigned by a company or enterprise, the main disadvantage of the approach is in low efficiency and high costs. On the one hand, the number of employed collecting employees is limited, an information collection speed and efficiency are not high, and a relatively long time is needed to complete the collection covering main cities and business areas. On the other hand, assigning dedicated employees, providing equipment and performing outdoor collection result in relatively high costs and large outlay.
2) Regarding the approach of collecting using user uploaded data, based on the crowdsourcing idea, the efficiency of collecting data in this approach is higher than the approach of directly assigning dedicated employees for collection, but the data-collecting accuracy is relatively difficult to control.
3) Regarding the approach of matching with surrounding POI names based on the SSID of the wireless hotspot, the approach exhibits a higher matching accuracy but a lower coverage because not all POIs provided with SSID of the wireless hotspot are directly related to the POI names.

SUMMARY

An object of some embodiments of the present disclosure is to provide a method and apparatus for matching a wireless hotspot with a POI.

According to an aspect of some embodiments of the present disclosure, there is provided a method for matching a wireless hotspot with a POI, wherein the method comprises the following steps:

obtaining position information of a wireless hotspot where the user locates, based on hotspot scanning information of wireless hotspots already scanned by the user;

acquiring one or more candidate POIs close to the wireless hotspot based on the position information;

based on characteristic information corresponding to the wireless hotspot and respective candidate POIs, ranking all candidate POIs to determine a POI matching the wireless hotspot, wherein the characteristic information comprises access characteristic information.

According to an aspect of some embodiments of the present disclosure, there is provided an apparatus for matching a wireless hotspot with a POI, wherein the apparatus comprises:

means for obtaining position information of a wireless hotspot where the user locates, based on hotspot scanning information of wireless hotspots already scanned by the user;

means for acquiring one or more candidate POIs close to the wireless hotspot based on the position information;

means for, based on characteristic information corresponding to the wireless hotspot and respective candidate POIs, ranking all candidate POIs to determine a POI matching the wireless hotspot, wherein the characteristic information comprises access characteristic information.

As compared with the prior art, some embodiments of the present disclosure include the following advantages: the POI matching the wireless hotspot is obtained based on relevant data that the user scans the wireless hotspot to predict the POI actually accessed by the user without a procedure of manually collecting the data or user feedback, thereby improving the efficiency; furthermore, the matched POI is determined based on the access characteristic information of the wireless hotspot and POI, and the accuracy of the matching result is boosted.

BRIEF DESCRIPTION OF THE DRAWINGS

Other features, objectives and advantages of the present application will be made more apparent by reading through detailed description of non-restrictive embodiments with the following figures.

Identical or like reference signs in the figures denote identical or like parts.

DETAILED DESCRIPTION OF EMBODIMENTS

Some The present disclosure will be described in further detail with reference to figures.

Figure 1:
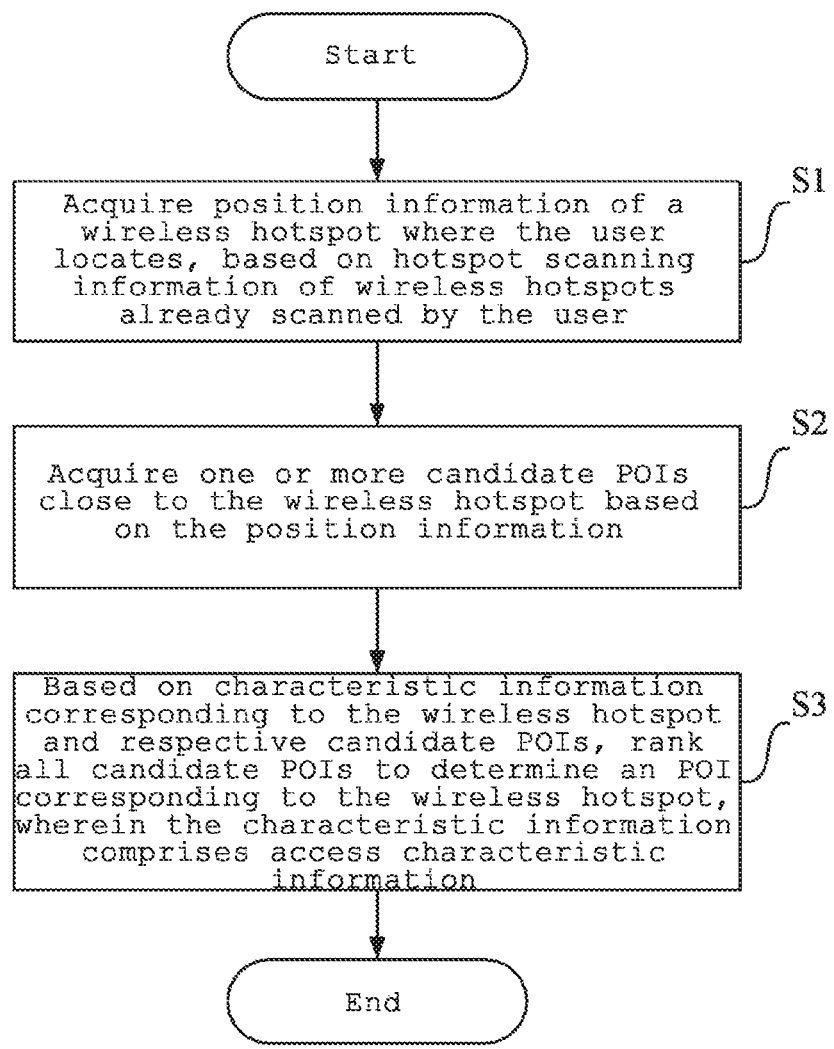
FIG. 1 illustrates a flow chart of a method for matching a wireless hotspot with a POI according to some embodiments of the present disclosure.

FIG. 1 illustrates a flow chart of a method for matching a wireless hotspot with a POI according to some embodiments of the present disclosure. The illustrated method according to comprises step S1, step S2 and step S3.

The method according to some embodiments of the present disclosure is implemented by a matching apparatus included in a computer equipment. The computer equipment can include an electronic device capable of automatically performing value calculation and/or information processing according to an instruction set or stored in advance, and its hardware comprises but is not limited to a microprocessor, an application-specific integrated circuit (ASIC), a field programmable gate array (FPGA), a digital signal processor (DSP), an embedded device and the like. The computer equipment comprises a network device and/or user equipment. The network device comprises but is not limited to a single network server, a server group comprised of multiple network servers, or cloud based on cloud computing and comprised of a lot of host machines or network servers, Here, cloud computing is a kind of distributed computing and is a super virtual computer comprised of a group of loosely-coupled computer sets. The user equipment comprises but is not limited to any electronic product capable of performing human-machine interaction with the user via a keyboard, mouse, remote controller, touch panel or acoustically-controlled device, such as a tablet computer, a smart phone, PDA, a gaming machine or the like.

In some embodiments, the user equipment comprises a mobile terminal such as a smart phone.

In some embodiments, the user equipment may scan close to wireless network (WiFi).

It is appreciated that the user equipment, network equipment and network are only examples, other user equipment, network equipment and network that are currently existing or might occur in the future are adapted for some embodiments of the present disclosure, should be included in the protection scope of the present disclosure, and are included herein by reference.

Referring to FIG. 1, at step S1, a matching apparatus acquires position information of a wireless hotspot where the user locates, based on hotspot scanning information of wireless hotspots already scanned by the user.

Here, the hotspot scanning information comprises position information of the wireless hotspot. In some embodiments, the hotspot scanning information may further comprise information of the wireless hotspot such as name and signal intensity.

Here, the position information comprises various information indicative of geographic position. In some embodiments, the position information comprises location coordinate information.

Specifically, for each wireless hotspot already scanned, the matching apparatus may obtain its corresponding position information by directly performing positioning for the wireless hotspot.

In some embodiments, the matching apparatus first performs pretreatment for the hotspot scanning information to remove data related to the mobile hotspot. Then, based on the hotspot scanning information after the pretreatment, the matching apparatus determines the position information of the wireless hotspot where the user locates.

For example, the matching apparatus calculates a variance of all valid positioning point distances and an average positioning point distance of a certain wireless hotspot. When the variance is higher than 500 meters, the hotspot is believed as being a mobile hotspot and is to be removed.

In some embodiments, the matching apparatus may consider the wireless hotspot already connected by the user as the wireless hotspot where the user locates, and acquire its position information.

It needs to be appreciated that when the user scans a certain wireless hotspot using a user equipment, a plurality of positioning points corresponding to the wireless hotspot might be generated due to the location difference.

In some embodiments, when a plurality of positioning points corresponding to the wireless hotspot are generated when the user scans a certain wireless hotspot using a user equipment, the matching apparatus, based on position information of respective positioning points of the wireless hotspot, calculates an average position as the position information of the wireless hotspot.

In some embodiments, the matching apparatus may, based on the signal intensity of each of the plurality of positioning points, select one or more of the plurality of positioning points as valid positioning points, and based on position information of all valid positioning points, calculate an average position as the position information of the wireless hotspot.

According to a first example of some embodiments of the present disclosure, the matching apparatus comprises is included in a server of a website providing online advertisement pushing service. The user uses a smart phone to scan close to wireless hotspot and finds a wireless hotspot wifi_1, and the matching apparatus obtains wireless hotspot information which comes from the smart phone and corresponds to the wireless hotspot wifi_1. The wireless hotspot information comprises: position information and signal intensity information of the plurality of positioning points corresponding to the wireless hotspot wifi_1. A first acquiring means 1 selects a positioning point with a signal intensity higher than −80 dBm as a valid positioning point, then based on longitude and latitude coordinate information of a plurality of valid positioning points, calculates to obtain an average location coordinate information location_1, as the position information of the wireless hotspot wifi_1.

It needs to be appreciated that the above examples are only intended to illustrate the technical solution of some embodiments of the present disclosure, not to limit the present disclosure. Those skilled in the art should appreciate that any implementation mode of acquiring the position information of the wireless hotspot where the user locates based on the hotspot scanning information of all wireless hotspots already scanned by the user should all fall within some embodiments of the scope of the present disclosure.

Then, at step S2, the matching apparatus acquires one or more candidate POIs close to (for example, within a certain distance of) the wireless hotspot based on the position information.

Specifically, the matching apparatus acquires, based on the position information of the wireless spot, one or more POIs within a predetermined range away from the position as candidate POIs, wherein the matching apparatus acquires position information of each POI from map data and calculates respective distances from the position information.

Further to illustrate the preceding first example, the matching apparatus, based on location coordinate information location_1, considers POIs within 300 meters away from the position as candidate POIs.

Then, at step S3, the matching apparatus, based on characteristic information corresponding to the wireless hotspot and respective candidate POIs, rank all candidate POIs to determine a POI matching the wireless hotspot.

Here, the characteristic information comprises access characteristic information. The access feature information is used to indicate total times and total person-times that users scan the wireless hotspot or search for POI within a predetermined time period.

In some embodiments, the access characteristic information includes probability distribution information of users' access within a predetermined time period obtained via statistics, for example, probability distribution information of total times that users scan wireless hotspot or search for a POI each hour in the past one day.

In some embodiments, the characteristic information may further comprise information indicative of characteristic attributes of the wireless hotspot or POI, for example, category characteristic information of a POI such as "shopping", "delicious food" or "hotel".

Here, the matching apparatus may obtain access characteristic information by acquiring historical scan data that multiple users scan the wireless hotspot, and obtain its characteristic information by acquiring historical search data that multiple users search for POIs.

Specifically, the matching apparatus may directly determine similarity information between the wireless hotspot with each of the candidate POIs based on the calculated characteristic information, and rank all candidate POIs based on similarity information.

For example, the matching apparatus determines similarity information of the wireless hotspot and candidates POIs based on total times that users scan the wireless hotspot in the past one hour, total person-times that users search for each of the candidate POIs, and based on a difference of the two, so that the similarity is higher when the difference is smaller, and ranks all candidate POIs based on the similarity.

According to some embodiments of the present disclosure, the characteristic information includes parameter characteristic information as input parameter of a ranking model, and the step S3 comprises step S301 (not shown) and step S302 (not shown).

At step 301, the matching apparatus, based on the ranking model and based on one or more piece of parameter characteristic information corresponding to the wireless hotspot and each of the candidate POIs, calculates matching degree information of the wireless hotspot and each of the candidate POIs.

Here, the ranking model comprises various models which are built based on a machine learning method, may be used to estimate a matching degree of the wireless hotspot and the plurality of POIs and rank all POIs.

In some embodiments, the matching apparatus uses the ranking model obtained based on a learn-to-rank method to calculate matching degree information of the wireless hotspot and each of the candidate POIs.

In some embodiments, the matching apparatus may use LambdaMART algorithm to obtain the ranking model.

Here, the parameter characteristic information as the input parameter of the ranking model comprises but is not limited to at least one of the following items of information:
1) access characteristic information of the wireless hotspot;
2) access characteristic information of each of the candidate POIs;
3) relevancy characteristic information of the wireless hotspot and each of the candidate POIs; in some embodiments, the relevancy characteristic information comprises:
i) a distance between the wireless hotspot and poi;
ii) a vector of the wireless hotspot and poi access characteristic information; for example, an inner product of the probability distribution information of total times that users scan the wireless hotspot or search for POI.
iii) a ratio of total times to total person-times of access of users corresponding to the wireless hotspot and POI.

Then, at step S302, the matching apparatus, based on the matching degree information, rank all candidate POIs to determine the POI matching the wireless hotspot.

Further to illustrate the preceding first example, the matching apparatus employs a ranking model model_1 obtained based on LambdaMART algorithm. The access characteristic information obtained by the matching apparatus in a way that multiple users scan historical scan data of the wireless hotspot wifi_1 comprises probability distribution information pro_1 of total times and total person-times that users scan 24 hours each day in the past one week, and the access characteristic information obtained in a way that multiple users search for historical search data of each POI comprises: probability distribution information pro_2 of total times and total person-times that users search for each of the candidate POIs 24 hours each day in the past one week.

The matching apparatus obtains the following parameter characteristic information as the input parameter of the ranking model model_1: probability distribution information pro_1 corresponding to the wireless hotspot wifi_1; probability distribution information pro_2 corresponding to each of the candidate POIs; an inner product of probability distribution information pro_1 and probability distribution information pro_2; and a ratio of total times to total person-times of access of users corresponding to the wireless hotspot and each POI.

Then, the matching apparatus, based on the above parameter characteristic information, calculates the matching degree information of the wireless hotspot wifi_1 and each of the candidate POIs, ranks all candidate POIs, and considers a candidate POI ranking the first as the POI matching the wireless hotspot wifi_1.

It needs to be appreciated that the above examples are only intended to illustrate the technical solution of some embodiments of the present disclosure, not to limit the present disclosure. Those skilled in the art should appreciate that any implementation mode that the matching apparatus, based on characteristic information corresponding to the wireless hotspot and each of the candidate POIs, ranks all candidate POIs to determine the POI matching the wireless hotspot should all fall within the scope of some embodiments of the present disclosure.

In some embodiments, the ranking model is trained by executing step S4 (not shown) and step S5 (not shown).

At step S4, the matching apparatus acquires characteristic training information corresponding to a plurality of wireless hotspots and candidate POIs close to the plurality of wireless hotspots.

In some embodiments, the matching apparatus may, based on an editing distance of name information of the wireless hotspot away from name information of each POI, select one or more of the POIs within the predetermined range as the candidate POI.

At step S5, the matching apparatus trains the ranking model based on the characteristic training information.

The matching apparatus may train the ranking model by executing step S4 and step S5 for multiple times, and estimate an accuracy rate of the trained ranking model based on a predetermined method. For example, a batch of verification data may be constructed. The verification data is input into the ranking model, and statistics is performed for the accuracy rate of a ranking result.

According to the method of some embodiments of the present disclosure, the POI matching the wireless hotspot is obtained based on relevant data that the user scans the wireless hotspot to predict the POI actually accessed by the user without a procedure of manually collecting the data or user feedback, thereby improving the efficiency; furthermore, according to the method of some embodiments of the present disclosure, the matched POI is determined based on the access characteristic information of the wireless hotspot and POI, and the accuracy of the matching result is boosted.

Figure 2:
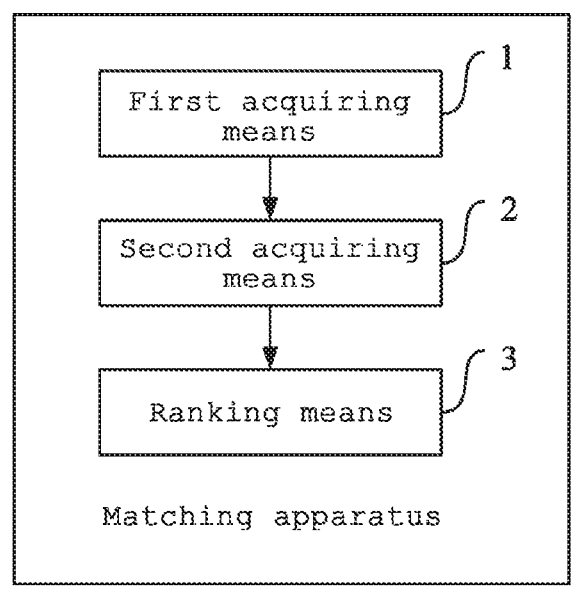
FIG. 2 illustrates a block diagram of a matching apparatus for matching a wireless hotspot with a POI according to some embodiments of the present disclosure.

FIG. 2 illustrates a block diagram of a matching apparatus for matching a wireless hotspot with a POI according to some embodiments of the present disclosure.

The matching apparatus according to some embodiments of the present disclosure comprises: a first module (hereinafter referred to as "first obtaining means 1") configured to obtain position information of a wireless hotspot where the user locates, based on hotspot scanning information of wireless hotspots already scanned by the user; a second module (hereinafter referred to as "second acquiring means 2") configured to acquire one or more candidate POIs close to the wireless hotspot according to the position information; and a third module (hereinafter referred to as "ranking means 3") configured to, based on characteristic information corresponding to the wireless hotspot and respective candidate POIs, rank all candidate POIs to determine a POI corresponding to the wireless hotspot.

Referring to FIG. 2, the first acquiring means 1 acquires position information of a wireless hotspot where the user locates, based on hotspot scanning information of wireless hotspots already scanned by the user.

Here, the hotspot scanning information comprises position information of the wireless hotspot. In some embodiments, the hotspot scanning information may further comprise information of the wireless hotspot such as name and signal intensity.

Here, the position information comprises various information indicative of geographic position. In some embodiments, the position information comprises location coordinate information.

Specifically, for each wireless hotspot already scanned, the first acquiring means may obtain its corresponding position information by directly performing positioning for the wireless hotspot.

In some embodiments, the first acquiring means 1 comprises: means (not shown; hereinafter referred to "a pretreatment means") for performing pretreatment for the hotspot scanning information to remove data related to the mobile hotspot, and means (not shown; hereinafter referred to as "position determining means") for determining the position information of the wireless hotspot where the user locates.

The pretreatment means first performs pretreatment for the hotspot scanning information to remove data related to the mobile hotspot. Then, the position determining means, based on the hotspot scanning information after the pretreatment, determines the position information of the wireless hotspot where the user locates.

For example, the pretreatment means calculates a variance of all valid positioning point distances and an average positioning point distance of a certain wireless hotspot. When the variance is higher than 500 meters, the hotspot is believed as being a mobile hotspot and is to be removed.

In some embodiments, the first acquiring means 1 may consider the wireless hotspot already connected by the user as the wireless hotspot where the user locates, and acquire its position information.

It needs to be appreciated that when the user scans a certain wireless hotspot using a user equipment, a plurality of positioning points corresponding to the wireless hotspot might be generated due to the location difference.

In some embodiments, when a plurality of positioning points corresponding to the wireless hotspot are generated when the user scans a certain wireless hotspot using a user equipment, the first acquiring means 1, based on position information of respective positioning points of the wireless hotspot, calculates an average position as the position information of the wireless hotspot.

In some embodiments, the first acquiring means 1 may, based on the signal intensity of each of the plurality of positioning points, select one or more of the plurality of positioning points as valid positioning points, and based on position information of all valid positioning points, calculate an average position as the position information of the wireless hotspot.

According to a first example of some embodiments of the present disclosure, the matching apparatus comprises is included in a server of a website providing online advertisement pushing service. The user uses a smart phone to scan close to wireless hotspot and finds a wireless hotspot wifi_1, and the matching apparatus obtains wireless hotspot information which comes from the smart phone and corresponds to the wireless hotspot wifi_1. The wireless hotspot information comprises: position information and signal intensity information of the plurality of positioning points corresponding to the wireless hotspot wifi_1. A first acquiring means 1 selects a positioning point with a signal intensity higher than −80 dBm as a valid positioning point, then based on longitude and latitude coordinate information of a plurality of valid positioning points, calculates to obtain an average location coordinate information location_1, as the position information of the wireless hotspot wifi_1.

It needs to be appreciated that the above examples are only intended to illustrate the technical solution of some embodiments of the present disclosure, not to limit the present disclosure. Those skilled in the art should appreciate that any implementation mode of acquiring the position information of the wireless hotspot where the user locates based on the hotspot scanning information of all wireless hotspots already scanned by the user should all fall within the scope of some embodiments of the present disclosure.

Then, the second acquiring means 2 acquires one or more candidate POIs close to the wireless hotspot based on the position information.

Specifically, the second acquiring means 2, based on the position information of the wireless spot, acquires one or more POIs within a predetermined range away from the position as candidate POIs, wherein the second acquiring means 2 acquires position information of each POI from map data and calculates respective distances from the position information.

Further to illustrate the preceding first example, the second acquiring means 2, based on location coordinate information location_1, considers POIs within 300 meters away from the position as candidate POIs.

Then, the ranking means 3, based on characteristic information corresponding to the wireless hotspot and respective candidate POIs, rank all candidate POIs to determine a POI matching the wireless hotspot.

Here, the characteristic information comprises access characteristic information. The access characteristic information is used to indicate total times and total person-times that users scan the wireless hotspot or search for POI within a predetermined time period.

In some embodiments, the access characteristic information includes probability distribution information of users' access within a predetermined time period obtained via statistics, for example, probability distribution information of total times that users scan wireless hotspot or search for POI each hour in the past one day.

In some embodiments, the characteristic information may further comprise information indicative of characteristic attributes of the wireless hotspot or POI, for example, category information of POI such as "shopping", "delicious food" or "hotel".

Here, the matching apparatus may obtain access characteristic information by acquiring historical scan data that multiple users scan the wireless hotspot, and obtain its characteristic information by acquiring historical search data that multiple users search for POIs.

Specifically, the ranking means 3 may directly determine similarity information between the wireless hotspot with each of the candidate POIs based on the calculated characteristic information, and rank all candidate POIs based on similarity information.

For example, the ranking means 3 determines similarity information of the wireless hotspot and candidates POIs based on total times that users scan the wireless hotspot in the past one hour, total person-times that users search for each of the candidate POIs, and based on a difference of the two, so that the similarity is higher when the difference is smaller, and ranks all candidate POIs based on the similarity.

According to some embodiments of the present disclosure, the characteristic information includes parameter characteristic information as an input parameter of a ranking model. The ranking means 3 comprises means (not shown; hereinafter referred to as "calculating means") for, based on the ranking model and based on one or more piece of characteristic information corresponding to the wireless hotspot and each of the candidate POIs, calculating matching degree information of the wireless hotspot and each of the candidate POIs, and means (not shown; hereinafter referred to as "sub-ranking means) for, based on the matching degree information, ranking all candidate POIs to determine the POI matching the wireless hotspot.

The calculating means, based on the ranking model and based on one or more piece of characteristic information corresponding to the wireless hotspot and each of the candidate POIs, calculates matching degree information of the wireless hotspot and each of the candidate POIs.

Here, the ranking model comprises various models which are built based on a machine learning method, and may be used to estimate a matching degree of the wireless hotspot and the plurality of POIs and rank all POIs.

In some embodiments, the matching apparatus uses the ranking model obtained based on a learn-to-rank method to calculate matching degree information of the wireless hotspot and each of the candidate POIs.

In some embodiments, the matching apparatus may use LambdaMART algorithm to obtain the ranking model.

Here, the parameter characteristic information as the input parameter of the ranking model comprises but is not limited to at least one of the following items of information:
1) access characteristic information of the wireless hotspot;
2) access characteristic information of each of the candidate POIs;
3) relevancy characteristic information of the wireless hotspot and each of the candidate POIs; in some embodiments, the relevancy characteristic information comprises:
i) a distance between the wireless hotspot and poi;
ii) a vector of the wireless hotspot and POI access characteristic information; for example, an inner product of the probability distribution information of total times that users scan the wireless hotspot or search for POI.
iii) a ratio of total times to total person-times of access of users corresponding to the wireless hotspot and POI.

Then, the sub-ranking means, based on the matching degree information, rank all candidate POIs to determine the POI matching the wireless hotspot.

Further to illustrate the preceding first example, the matching apparatus employs a ranking model model_1 obtained based on LambdaMART algorithm. The access characteristic information obtained by the matching apparatus in a way that multiple users scan historical scan data of the wireless hotspot wifi_1 comprises probability distribution information pro_1 of total times and total person-times that users scan 24 hours each day in the past one week, and the access characteristic information obtained in a way that multiple users search for historical search data of each POI comprises: probability distribution information pro_2 of total times and total person-times that users search for each of the candidate POIs 24 hours each day in the past one week.

The matching apparatus obtains the following parameter characteristic information the as input parameter of the ranking model model_1: probability distribution information pro_1 corresponding to the wireless hotspot wifi_1; probability distribution information pro_2 corresponding to each of the candidate POIs; an inner product of probability distribution information pro_1 and probability distribution information pro_2; and a ratio of total times to total person-times of access of users corresponding to the wireless hotspot and each POI.

Then, the calculating means, based on the above parameter characteristic information, calculates the matching degree information of the wireless hotspot wifi_1 and each of the candidate POIs, and the sub-ranking means ranks all candidate POIs, and considers a candidate POI ranking the first as the POI matching the wireless hotspot wifi_1.

It needs to be appreciated that the above examples are only intended to illustrate the technical solution of some embodiments of the present disclosure, not to limit the present disclosure. Those skilled in the art should appreciate that any implementation mode that the matching apparatus, based on characteristic information corresponding to the wireless hotspot and each of the candidate POIs, ranks all candidate POIs to determine the POI matching the wireless hotspot should all fall within the scope of some embodiments of the present disclosure.

In some embodiments, the matching apparatus further comprises means (not shown; hereinafter referred to as "training acquiring means") for acquiring characteristic training information corresponding to a plurality of wireless hotspots and candidate POIs close to the plurality of wireless hotspots, and means (not shown; hereinafter referred to "model training means") for training the ranking model based on the characteristic training information.

The training acquiring means acquires characteristic training information corresponding to a plurality of wireless hotspots and candidate POIs close to the plurality of wireless hotspots.

In some embodiments, the training acquiring means may, based on an editing distance of name information of the wireless hotspot away from name information of each POI, select one or more of the POIs within the predetermined range as the candidate POI.

The model training means trains the ranking model based on the characteristic training information.

The matching apparatus may train the ranking model by executing the training acquiring means and model training means for multiple times, and estimate an accuracy rate of the trained ranking model based on a predetermined method. For example, a batch of verification data may be constructed. The verification data is input into the ranking model, and statistics is performed for the accuracy rate of a ranking result.

According to the solution of some embodiments of the present disclosure, the POI matching the wireless hotspot is obtained based on relevant data that the user scans the wireless hotspot to predict the POI actually accessed by the user without a procedure of manually collecting the data or user feedback, thereby improving the efficiency; furthermore, according to the solution of some embodiments of the present disclosure, the matched POI is determined based on the access characteristic information of the wireless hotspot and POI, and the accuracy of the matching result is boosted.

The software program of some embodiments of the present disclosure may be executed by a processor to perform the above steps or functions. Likewise, the software program of some embodiments of the present disclosure (including the relevant data structure) may be stored in a computer-readable recording medium, e.g., RAM memory, magnetic or optical driver or soft floppy or a similar device. Additionally, some steps or functions of some embodiments of the present disclosure may be implemented using hardware, e.g., as a circuit cooperating with the processor to perform various functions or steps.

In addition, a portion of some embodiments of the present disclosure may be applied as a computer program product, e.g., a computer program instruction. When it is executed by the computer, a method and/or technical solution according to some embodiments of the present disclosure may be invoked or provided through operations of the computer. The program instruction for invoking the method of some embodiments of the present disclosure may be stored in a stationary or movable recording medium, and/or transmitted via data stream in broadcast or other signal bearing media, and/or stored in a working memory of a computer device running according to the program instruction. Here, some embodiments according to the present disclosure includes a device which includes a memory for storing the computer program instruction and a processor for executing the program instruction, wherein when the computer program instruction is executed by the processor, the device is triggered to run the method and/or technical solution in a plurality of embodiments according to some embodiments of the present disclosure.

For those skilled in the art, it is obvious that some embodiments of the present disclosure is not limited to the details of the above embodiments, and the present disclosure can be implemented in other specific forms without departing from the spirit or basic features of the present disclosure. Therefore, in any way, the embodiments shall be regarded as exemplary rather than limiting; the scope of the present disclosure is limited by the appended claims, instead of the above description. Thus, all variations which fall into the meaning and scope of equivalent elements of the claims shall be covered within the present disclosure. No reference signs in the claims shall be regarded as limiting the involved claims. Besides, it is obvious that the term "comprise" does not exclude other units or steps, and singularity does not exclude plurality. A plurality of units or means set forth in a system claim may also be implemented by a single unit or means through software or hardware. Terms such as first and second are used to indicate names, but do not indicate any particular sequence. Various components disclosed and/or illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for matching a wireless hotspot with a Point of Interest ("POI"), comprising:
    obtaining position information of a wireless hotspot located by a plurality of user devices based on hotspot scanning information of wireless hotspots scanned by the plurality of user devices;
    calculating a position variance for the wireless hotspot;
    comparing the position variance to a threshold variance;
    determining that the wireless hotspot is a mobile hotspot in response to determining that the position variance is greater than the threshold variance and not performing matching of POIs for mobile hotspots;
    acquiring one or more candidate POIs close to the wireless hotspot based on the position information;
    ranking each of the candidate POIs based on characteristic information corresponding to the wireless hotspot and each of the candidate POIs, to determine a POI matching the wireless hotspot,
    wherein the characteristic information includes access characteristic information, the access characteristic information including probability distribution information of users' access within a predetermined time period obtained via statistics,
    wherein the ranking comprises computing, for each of the one or more candidate POIs, a degree of matching with the wireless hotspot, by performing the steps of:
        determining a first probability distribution information of users' historical scanning for the wireless hotspot within the predetermined time period, determining a second probability distribution information of users' searching for each of the candidate POIs within the predetermined time period, and
        computing a ratio of the first probability distribution information and the second probability distribution information for each candidate POI; and transmitting a message based on the ranking.

2. The method according to claim 1, wherein the characteristic information further includes parameter characteristic information as an input parameter of a ranking model, and wherein the ranking further comprises:
    calculating the degree of matching based on the ranking model, and based on one or more pieces of the parameter characteristic information; and
    ranking each of the candidate POIs to determine the POI matching the wireless hotspot, based on the degree of matching.

3. The method according to claim 2, the method further comprising:

acquiring characteristic training information corresponding to a plurality of wireless hotspots and candidate POIs close to the plurality of wireless hotspots; and
training the ranking model based on the characteristic training information.

4. The method according to claim 2, wherein the parameter characteristic information includes:
access characteristic information of the wireless hotspot;
access characteristic information of each of the candidate POIs; and
relevancy characteristic information between the wireless hotspot and each of the candidate POIs.

5. The method according to claim 1, wherein obtaining the position information of the wireless hotspot located by the user device, based on the hotspot scanning information of the wireless hotspots scanned by the user device, comprises:
pre-treating the hotspot scanning information to remove data relating to mobile hotspots; and
determining the position information of the wireless hotspot where the user locates, based on the pre-treated hotspot scanning information.

6. The method according to claim 1, wherein when a plurality of positioning points corresponding to the wireless hotspot are generated when the user device scans a certain wireless hotspot, and
obtaining the position information of the wireless hotspot located by the user device, based on the hotspot scanning information of the wireless hotspots scanned by the user device, comprises:
calculating an average position as the position information of the wireless hotspot, based on position information of the positioning points of the wireless hotspot.

7. The method according to claim 1, wherein acquiring the one or more candidate POIs close to the wireless hotspot according to the position information comprises:
acquiring, based on the position information of the wireless spot, one or more POIs within a predetermined range away from the position as the one or more candidate POIs.

8. The method according to claim 4, wherein the relevancy characteristic information between the wireless hotspot and the first candidate POI comprises at least one of:
a product of probability distribution information of total times that users scan the wireless hotspot or search for the first POI; or
a ratio of total times to total user times of access to the wireless hotspot and the first POI by users.

9. An apparatus for matching a wireless hotspot with a POI, the matching apparatus comprising:
at least one processor; and
a memory storing instructions, which when executed by the at least one processor, cause the at least one processor to perform operations comprising:
obtaining position information of a wireless hotspot located by a plurality of user devices, based on hotspot scanning information of wireless hotspots scanned by the plurality of user devices;
calculating a position variance for the wireless hotspot;
comparing the position variance to a threshold variance;
determining that the wireless hotspot is a mobile hotspot in response to determining that the position variance is greater than the threshold variance and not performing matching of POIs for mobile hotspots;
acquiring one or more candidate POIs close to the wireless hotspot based on the position information;
ranking each of the candidate POIs based on characteristic information corresponding to the wireless hotspot and respective candidate POIs, to determine an POI corresponding to the wireless hotspot,
wherein the characteristic information includes access characteristic information, the access characteristic information including probability distribution information of users' access within a predetermined time period obtained via statistics,
wherein the ranking comprises computing, for each of the one or more candidate POIs, a degree of matching with the wireless hotspot, by performing the steps of
determining a first probability distribution information of users' historical scanning for the wireless hotspot within the predetermined time period,
determining a second probability distribution information of users' searching for each of the candidate POIs within the predetermined time period, and
computing a ratio of the first probability distribution information and the second probability distribution information for each candidate POI; and
transmitting a message based on the ranking.

10. The matching apparatus according to claim 9, wherein the characteristic information further includes parameter characteristic information as an input parameter of a ranking model, and wherein the ranking further comprises:
calculating the degree of matching based on the ranking model, and based on one or more pieces of the parameter characteristic information; and
ranking each of the candidate POIs to determine the POI matching the wireless hotspot, based on the degree of matching.

11. The matching apparatus according to claim 10, the operations further comprising:
acquiring characteristic training information corresponding to a plurality of wireless hotspots and candidate POIs close to the plurality of wireless hotspots;
training the ranking model based on the characteristic training information.

12. The matching apparatus according to claim 10, wherein the parameter characteristic information includes:
access characteristic information of the wireless hotspot;
access characteristic information of each of the candidate POIs; and
relevancy characteristic information of the wireless hotspot and each of the candidate POIs.

13. The matching apparatus according to claim 9, wherein obtaining position information of the wireless hotspot located by the user device, based on the hotspot scanning information of the wireless hotspots scanned by the user device, comprises:
pre-treating the hotspot scanning information to remove data relating to mobile hotspots; and
determining the position information of the wireless hotspot where the user locates, based on the pre-treated hotspot scanning information.

14. The matching apparatus according to claim 13, wherein when a plurality of positioning points corresponding to the wireless hotspot are generated when the user device scans a certain wireless hotspot, and
obtaining position information of the wireless hotspot located by the user device, based on the hotspot scanning information of the wireless hotspots scanned by the user device comprises:
calculating an average position as the position information of the wireless hotspot, based on position information of respective positioning points of the wireless hotspot.

15. The matching apparatus according to claim 9, wherein acquiring the one or more candidate POIs close to the wireless hotspot based on the position information comprises:
  acquiring, based on the position information of the wireless spot, one or more POIs within a predetermined range away from the position as the one or more candidate POIs.

16. A non-transitory computer storage medium storing a computer program, which when executed by one or more processors, causes the one or more processors to perform operations comprising:
  obtaining position information of a wireless hotspot located by a plurality of user devices, based on hotspot scanning information of wireless hotspots scanned by the plurality of user devices;
  calculating a position variance for the wireless hotspot;
  comparing the position variance to a threshold variance;
  determining that the wireless hotspot is a mobile hotspot in response to determining that the position variance is greater than the threshold variance and not performing matching of POIs for mobile hotspots;
  acquiring one or more candidate POIs close to the wireless hotspot based on the position information;
  ranking each of the candidate POIs based on characteristic information corresponding to the wireless hotspot and each of the candidate POIs, to determine a POI matching the wireless hotspot,
  wherein the characteristic information includes access characteristic information, the access characteristic information including probability distribution information of users' access within a predetermined time period obtained via statistics,
  wherein the ranking comprises computing, for each of the one or more candidate POIs, a degree of matching with the wireless hotspot, by performing the steps of
    determining a first probability distribution information of users' historical scanning for the wireless hotspot within the predetermined time period,
    determining a second probability distribution information of users' searching for each of the candidate POIs within the predetermined time period, and
    computing a ratio of the first probability distribution information and the second probability distribution information for each candidate POI; and
  transmitting a message based on the ranking.

17. The non-transitory computer storage medium according to claim 16, wherein the characteristic information further includes parameter characteristic information as an input parameter of a ranking model, and
  wherein the ranking further comprises:
    calculating the degree of matching based on the ranking model, and based on one or more pieces of the parameter characteristic information; and
    ranking each of the candidate POIs to determine the POI matching the wireless hotspot, based on the degree of matching.

18. The non-transitory computer storage medium according to claim 17, the operations further comprising:
  acquiring characteristic training information corresponding to a plurality of wireless hotspots and candidate POIs close to the plurality of wireless hotspots; and
  training the ranking model based on the characteristic training information.

19. The non-transitory computer storage medium according to claim 17, wherein the parameter characteristic information includes:
  access characteristic information of the wireless hotspot;
  access characteristic information of each of the candidate POIs; and
  relevancy characteristic information between the wireless hotspot and each of the candidate POIs.

20. The non-transitory computer storage medium according to claim 16, wherein obtaining the position information of the wireless hotspot located by the user device, based on the hotspot scanning information of the wireless hotspots scanned by the user device, comprises:
  pre-treating the hotspot scanning information to remove data relating to mobile hotspots; and
  determining the position information of the wireless hotspot where the user locates, based on the pre-treated hotspot scanning information.

21. The non-transitory computer storage medium according to claim 16, wherein when a plurality of positioning points corresponding to the wireless hotspot are generated when the user device scans a certain wireless hotspot, and obtaining the position information of the wireless hotspot located by the user device, based on the hotspot scanning information of the wireless hotspots scanned by the user device, comprises:
  calculating an average position as the position information of the wireless hotspot, based on position information of the positioning points of the wireless hotspot.

* * * * *